United States Patent
Song et al.

(10) Patent No.: US 10,019,477 B2
(45) Date of Patent: Jul. 10, 2018

(54) ANTICIPATORY QUERY COMPLETION BY PATTERN DETECTION

(71) Applicant: International Business Machines Corporation, Armonk, NY (US)

(72) Inventors: Ge Song, Beijing (CN); Kewei Wei, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 14/679,241

(22) Filed: Apr. 6, 2015

(65) Prior Publication Data

US 2016/0292172 A1  Oct. 6, 2016

(51) Int. Cl.
*G06F 17/30* (2006.01)

(52) U.S. Cl.
CPC .. *G06F 17/30424* (2013.01); *G06F 17/30457* (2013.01); *G06F 17/30554* (2013.01)

(58) Field of Classification Search
CPC ......... G06F 17/30424; G06F 17/30457; G06F 17/30554
See application file for complete search history.

(56) References Cited

U.S. PATENT DOCUMENTS

| | | | |
|---|---|---|---|
| 5,715,446 A * | 2/1998 | Kinoshita | ......... G06F 17/30985 |
| 6,212,514 B1 | 4/2001 | Eberhard et al. | |
| 6,330,552 B1 | 12/2001 | Farrar et al. | |
| 7,080,062 B1 | 7/2006 | Leung et al. | |
| 7,593,926 B2 | 9/2009 | Larson et al. | |
| 8,356,027 B2 | 1/2013 | Jaecksch et al. | |
| 2006/0047636 A1* | 3/2006 | Mohania | ........... G06F 17/30286 |
| 2006/0106777 A1 | 5/2006 | Faunce et al. | |
| 2006/0248078 A1* | 11/2006 | Gross | ................. G06F 17/3064 |
| 2007/0226178 A1 | 9/2007 | Ewen et al. | |
| 2008/0104070 A1* | 5/2008 | Lonchar | ........... G06F 17/30471 |
| 2009/0187515 A1* | 7/2009 | Andrew | ............. G06F 17/3064 706/12 |

(Continued)

OTHER PUBLICATIONS

Song et al., "Anticipatory Query Completion by Pattern Detection", U.S. Appl. No. 15/058,484, filed Mar. 2, 2016.

(Continued)

*Primary Examiner* — Jared M Bibbee
(74) *Attorney, Agent, or Firm* — Christopher McLane; Daniel R. Simek

(57) ABSTRACT

In an approach for query processing, a computer receives a query. The computer determines the received query does not correspond to a previously executed query. The computer parses the received query to identify input literals that include one or more of: data values, tables, fields, records, and a parameter included in the received query. The computer determines whether a pattern is associated with the input literals included in the received query. Responsive to determining a pattern is associated with the input literals, the computer determines a future parameter based on the pattern associated with the input literals, wherein the future parameter is a subsequent instance of a parameter of the received query that corresponds to the pattern. The computer creates a future query by incorporating the determined future parameter into the received query.

9 Claims, 3 Drawing Sheets

(56) References Cited

U.S. PATENT DOCUMENTS

| | | | | |
|---|---|---|---|---|
| 2009/0327888 | A1* | 12/2009 | Woolf | G06Q 10/10 715/704 |
| 2013/0024442 | A1* | 1/2013 | Santosuosso | G06F 17/30424 707/720 |
| 2013/0167036 | A1* | 6/2013 | Klein | G06Q 30/02 715/738 |
| 2013/0246322 | A1* | 9/2013 | De Sousa Webber | G06N 3/0454 706/18 |
| 2014/0046879 | A1* | 2/2014 | MacLennan | G06N 99/005 706/12 |
| 2014/0304250 | A1* | 10/2014 | Sankar | G06F 17/30657 707/713 |
| 2015/0081653 | A1* | 3/2015 | Hsu | G06F 3/04883 707/706 |
| 2015/0154316 | A1* | 6/2015 | Lightner | G06F 17/30312 707/723 |
| 2016/0188750 | A1* | 6/2016 | Lenahan | G06F 17/30967 707/706 |

OTHER PUBLICATIONS

Appendix P, List of IBM Patents or Patent Applications Treated as Related, 2 pages, dated Mar. 8, 2016.

Ganapathi, et al., "Predicting Multiple Metrics for Queries: Better Decisions Enabled by Machine Learning", Computer Science Division, University of California at Berkeley, published Mar. 29, 2009, 12 pages, <http://www.cs.berkeley.edu/~jordan/papers/ganapathi-etal-icde09.pdf>.

Gao, et al., "Evaluating Continuous Nearest Neighbor Queries for Streaming Time Series via Pre-fetching", CIKM'02, Nov. 4-9, 2002, pp. 485-492, Copyright 2002 ACM, <http://www.emba.uvm/edu.~xwang4/publications/CIKM02gao.pdf>.

Wu, et al., "Towards Predicting Query Execution Time for Concurrent and Dynamic Database Workloads", NEC Laboratories America, Proceedings of the VLDB Endowment, vol. 6, No. 10, Aug. 26-30, 2013, 12 pages, Copyright 2013 VLDB Endowment, <http://dl.acm.org/citation.cfm?id=2536219>.

* cited by examiner

ANTICIPATORY QUERY COMPLETION BY PATTERN DETECTION

BACKGROUND OF THE INVENTION

The present invention relates generally to the field of databases, and more particularly to performing future queries based on identifying query patterns.

Service oriented architecture continues to increase within the next generation of application programs to develop information systems by involving the interaction between loosely coupled services that function independently. Services carry out small functions that provide access to one or more resources which the service oriented architecture may bind though orchestration (i.e., integrates several services and exposes the result as a single service). Therefore, service oriented architecture are capable of leveraging the available services repeatedly within multiple applications. As the interactions within a service oriented architecture occur with loosely coupled services that operate independently, the complete recreation of services is unnecessary when upgrades or modifications are incorporated (e.g., customer credit check, weather data, banking transactions, etc.). The services access resources such as related databases through an abstract data layer (i.e., computer program providing simplified access to stored data), which allow the resource to be read or manipulated by client applications, or other services, while making the data appear equivalent to any other resource.

Relational database management systems (RDBMS) manage relational databases that store data, such as financial records, manufacturing and logistical information, and personnel data, by organizing the data into predefined data categories in the form of related tables also known as relations. Relationships between tables in relational databases are identified through the use of primary and foreign keys. A primary key is a special relational database column, or combination of columns, designed to uniquely identify all table records. The foreign key, while also a column or group of columns in a relational database, references the primary key of another table thus providing a cross reference link between the data in the tables. The remaining table structure includes columns, also referred to as fields, denoting one or more predefined data categories, and rows, also referred to as a record that contain a unique instance of the data respective to the columns. As the relational database is a collection of data items organized as a set of formally-described tables, minimal assumptions are included regarding how the data is related, or how the data will be extracted from the database. Therefore, due to the minimal assumptions, the data in a relational database can be accessed or reassembled in many different ways without reorganizing the relational database tables in order to meet the specifications of a user.

The data within a relational databases may be accessed by users through queries (i.e., requests for information). Common query methods include, choosing parameters from a menu list, by example (e.g., user specifies fields and values within a blank record that define the query), and query language (e.g., user makes requests through a stylized query written in a special query language). When performing a query for a relational database, the query specifies both the tables and the condition that links the tables. Through the queries, users then obtain a view of the relational database tailored to the specific needs of the user (e.g., arranging data items in a specified order, displaying only relevant items, etc.).

SUMMARY

Aspects of the present invention disclose a method, computer program product, and system for query processing. The method includes one or more computer processors receiving a query. The method further includes one or more computer processors determining the received query does not correspond to a previously executed query. The method further includes one or more computer processors parsing the received query to identify input literals that include one or more of: data values, tables, fields, records, and a parameter included in the received query. The method further includes one or more computer processors determining whether a pattern is associated with the input literals included in the received query. Responsive to determining a pattern is associated with the input literals, the method further includes one or more computer processors determining a future parameter based on the pattern associated with the input literals, wherein the future parameter is a subsequent instance of a parameter of the received query that corresponds to the pattern. The method further includes one or more computer processors creating a future query by incorporating the determined future parameter into the received query.

DETAILED DESCRIPTION

Service oriented architecture adds an abstract data access layer to relational databases as the data in the relational database is provided to the user through a service. The abstract data access layer refers to a layer of a computer program that provides simplified access to data stored in persistent storage, such as a relational database. Services are self-contained units of functionality as the logical representation of a repeatable business activity with specified outcomes (e.g., customer credit check, weather data, drilling reports, banking transactions, etc.). Embodiments of the present invention recognize relational databases may not incorporate data access patterns from services and perform traditional queries at the time of receipt, which may be a time consuming process. For example upon receipt of a query, the query traverses through the relational data service, data manager, and buffer manager, and then to the hard disk to obtain query results. The query results then return via the same path to the requestor. Embodiments of the present invention recognize the overall elapsed time to perform queries may be reduced by predicting future queries based on prior queries and data access patterns. Embodiments of the present invention are capable of executing and storing the results of the predicted future queries in cache prior to actually receiving a request, thereby allowing for faster response times when a user later requests a previously predicted query.

Figure 1:
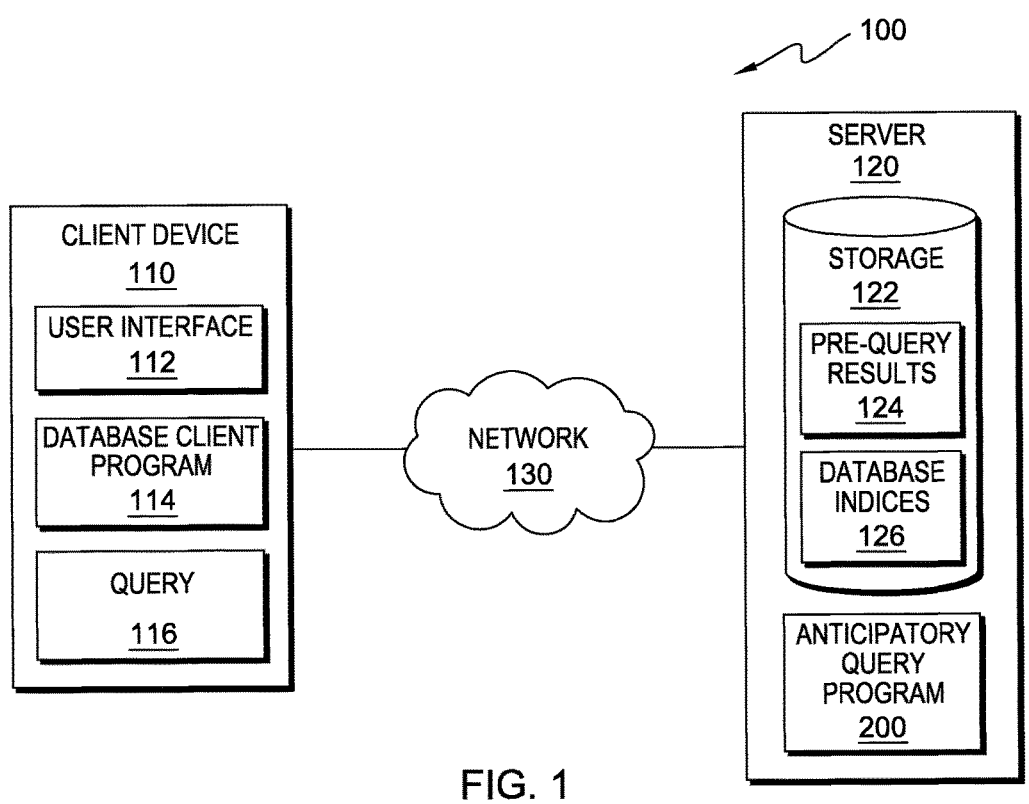
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes client device 110 and server 120 interconnected over network 130. Distributed data processing environment 100 may include additional computing devices, mobile computing devices, servers, computers, storage devices, or other devices not shown.

Client device 110 may be a web server or any other electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In other embodiments, client device 110 may represent a server computing system utilizing multiple computers as a server system, such as in a cloud computing environment. In general, client device 110 is representative of any electronic device or combination of electronic devices capable of executing machine readable program instructions as described in greater detail with regard to FIG. 3, in accordance with embodiments of the present invention. Client device 110 contains user interface 112, database client program 114, and query 116.

User interface 112 is a program that provides an interface between a user of client device 110 and a plurality of applications that reside on client device 110 (e.g., database client program 114) and/or may be accessed over network 130. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information (e.g., query 116, query results, database records, etc.) through database client program 114 to anticipatory query program 200.

Database client program 114 is a software program for creating and managing the information stored in a database, such as within fields, records, and files (e.g., database management system). Database client program 114 is capable of storing, modifying, extracting, and searching for information within a database. A user, through database client program 114, creates query 116 in order to extract and search for information within a database. Database client program 114 sends query 116 to anticipatory query program 200 and the database for which results are returned. In the depicted embodiment, database client program 114 resides on client device 110. In another embodiment, database client program 114 may reside on server 120. In some other embodiment, database client program 114 may reside on another server or computing device (not shown) connected over network 130 provided database client program 114 has access to query 116 and is accessible by anticipatory query program 200.

Query 116 is a user request for information from a database that when performed on the database returns results matching the specified criteria. In the depicted embodiment, query 116 resides on client device 110. In another embodiment, query 116 may reside on server 120. In some other embodiment, query 116 may reside on another server or computing device (not shown) connected over network 130 provided query 116 is accessible by database client program 114 and anticipatory query program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 contains storage 122 and anticipatory query program 200.

Storage 122 can be implemented with any type of storage device that is capable of storing data that may be accessed and utilized by client device 110. Value structures for data structure instances may be stored in storage 122. In the depicted embodiment, storage 122 resides on server 120. In another embodiment, storage 122 resides on client device 110. In other embodiments, storage 122 may reside on another server or another computing device connected over network 130, provided that storage 122 is accessible to client device 110 and anticipatory query program 200. Storage 122 includes pre-query results 124 and database indices 126.

Pre-query results 124 are the returned results of pre-determined queries performed by anticipatory query program 200 in advance of receipt of an actual query request from a user. Pre-query results 124 can be stored within cache to facilitate reduced processing times of future query requests from database client program 114. In the depicted embodiment, pre-query results 124 resides on server 120. In another embodiment, pre-query results 124 reside on client device 110. In other embodiments, pre-query results 124 may reside on another server or another computing device connected over network 130 provided that pre-query results 124 is accessible to client device 110 and anticipatory query program 200.

Database indices 126 are formal lists ordered in a particular manner within an existing table of a database that provide a means of locating data within the table efficiently. For example, database indices 126 utilizes the tables to presort the data into multiple perspectives at the same time by maintaining the details on the fields in the index and maintaining pointers to where the actual data is stored. Database indices 126 includes the information that provides the responses to query 116 (e.g., past, present, and future versions of query 116). In the depicted embodiment, database indices 126 resides on server 120. In another embodiment, database indices 126 reside on client device 110. In other embodiments, database indices 126 may reside on another server or another computing device connected over network 130 provided that database indices 126 is accessible to client device 110 and anticipatory query program 200.

Network 130 may be a local area network (LAN), a wide area network (WAN), such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Anticipatory query program 200 is a software program for predicting and executing future queries by identifying patterns within requests included in a prior query (e.g., query 116). Anticipatory query program 200 detects patterns within results of a previously completed query, such as query 116, and anticipates potential future query 116 requests. Once anticipatory query program 200 determines a pattern utilizing database indices 126, anticipatory query program 200 performs the potential future queries and stores results within pre-query results 124 for future access. In the depicted embodiment, anticipatory query program 200 resides on server 120. In another embodiment, anticipatory query program 200 resides on client device 110. In other embodiments, anticipatory query program 200 may reside on other devices, such as another server or computing device connected over network 130 provided that anticipatory query program 200 is accessible by database client program 114 and query 116 and has access to pre-query results 124 and database indices 126.

Figure 2:
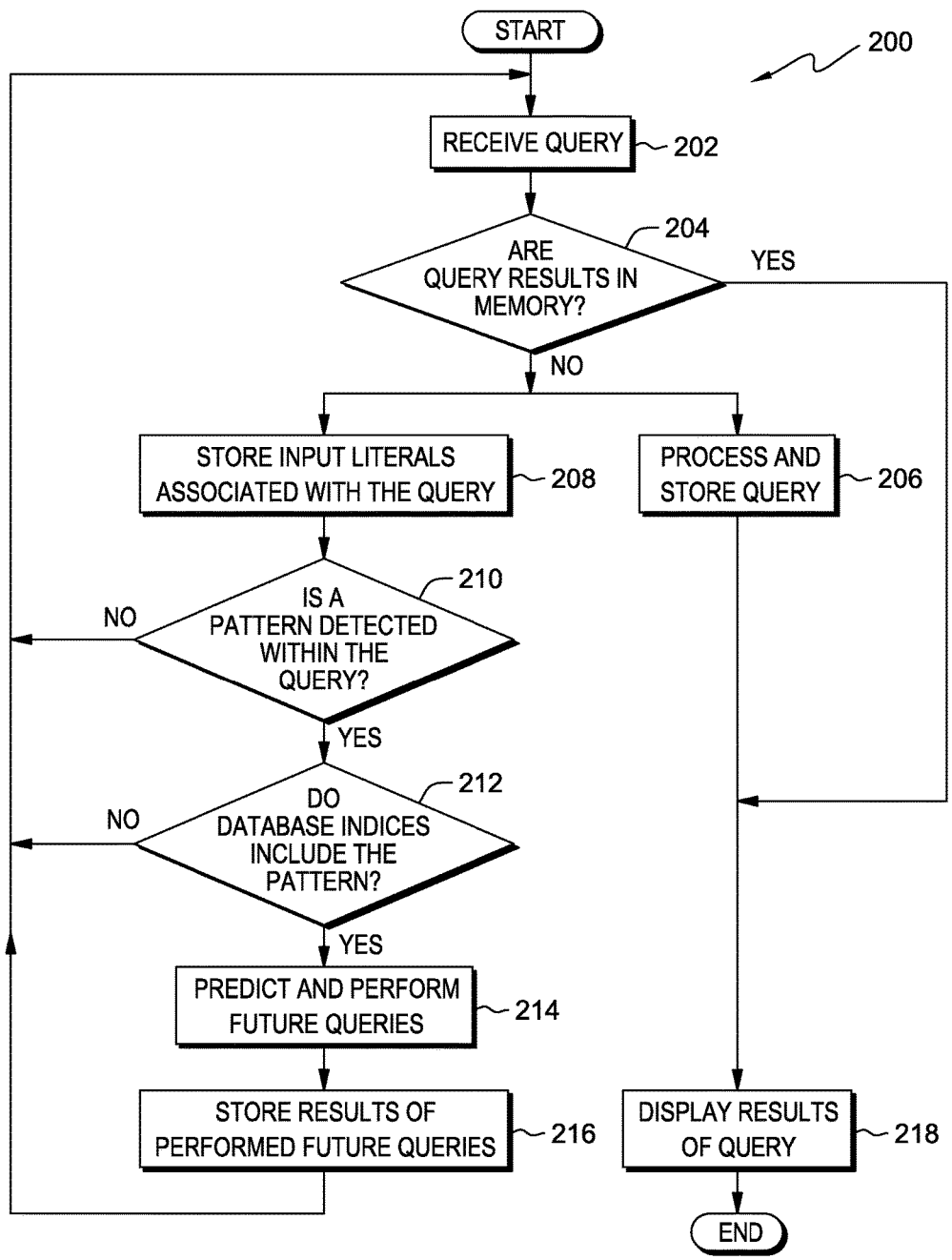
FIG. 2 is a flowchart depicting operational steps of an anticipatory query program, on a server computer within the distributed data processing environment of FIG. 1, for predicting and executing future queries based on identifying patterns within prior query requests, in accordance with an embodiment of the present invention.

FIG. 2 is a flowchart depicting operational steps of anticipatory query program 200, a program for predicting and executing future queries based on identifying patterns within requests included in a prior query (e.g., query 116), in accordance with an embodiment of the present invention. Prior to the initiation of anticipatory query program 200, a database of information should exist (e.g., database indices 126 are populated with information). For example, a business order entry database would include a customer table with column fields for: name, address, and phone number, and rows of records for the individual customers with the corresponding information relative to the fields.

In step 202, anticipatory query program 200 receives query 116 from database client program 114. The user of client device 110, through user interface 112 and database client program 114, creates query 116. For example, a branch manager creates query 116 that requests a report on customers purchasing a product on March 10. Through user interface 112 and database client program 114, the user of client device 110 selects to perform query 116. Upon receipt of the selection to perform query 116, database client program 114 sends query 116 to anticipatory query program 200. Anticipatory query program 200 then initiates at the time of receipt of query 116.

In decision 204, anticipatory query program 200 determines whether pre-query results 124 include the results to query 116. Query 116 includes commands that identify specific information and ultimately how to access database indices 126. Anticipatory query program 200 searches pre-query results 124 based on the commands included within query 116. Anticipatory query program 200 may then identify a match to query 116 (e.g., query 116 was previously performed) within pre-query results 124 (e.g., locates corresponding stored results). If anticipatory query program 200 determines pre-query results 124 includes the results to query 116 (yes branch, decision 204), then anticipatory query program 200 displays the results (e.g., corresponding results from pre-query results 124) of query 116 (step 218). If anticipatory query program 200 determines pre-query results 124 do not include the results to query 116 (e.g., query 116 was not performed previously) (no branch, decision 204), then anticipatory program 200 processes and stores results for query 116 (step 206) and stores the input literals associated with query 116 (step 208) in parallel.

In step 206, anticipatory query program 200 processes and stores the results for query 116. Anticipatory query program 200 identifies the tasks within the commands within query 116 for the database. Anticipatory query program 200 then parses the tasks, determining content associated with the tasks, compiles the information, and optimizes the tasks (e.g., determines the best way to access and acquire the information). Anticipatory query program 200 then performs query 116 and accesses database indices 126 for the data requested in query 116. At completion of query 116, anticipatory query program 200 returns results and stores the results in memory. In step 218, anticipatory query program 200 then displays the results of query 116 to the user.

In step 208, anticipatory query program 200 stores the input literals associated with query 116. Input literals refer to fixed data values (e.g., text, numerical, date/time, and interval) for which values may be specified as a parameter. Parameters are references or values that are passed into a program for execution in which an expected outcome is anticipated. Anticipatory query program 200 identifies the input literals within query 116 based on the syntax of query 116. For example, the syntax of query 116 for the branch manager may be: "SELECT customer name, customer address, customer phone, product date FROM business order WHERE product date=March 10." Anticipatory query program 200 identifies the input literals to include: customer name, customer address, customer phone, and product date, which when executed filter the data to include specific instances of data where the product date matches the parameter of March 10. Anticipatory query program 200 then stores the identified input literals and parameters within the cache.

In decision 210, anticipatory query program 200 determines whether query 116 includes a recognizable pattern. Anticipatory query program 200 accesses the cache, which stores the text and input literals from previous versions of query 116 and then compares the text and input literals of the current query 116 with the cache to determine similar versions of query 116. Anticipatory query program 200 determines previous similar versions of query 116 to be queries that include the same text and input literals but may include a different parameter (e.g., input literals are the same except for the parameter). Anticipatory query program 200 then tracks the previous similar versions of query 116 and determines whether a recognizable pattern exists within the data. Anticipatory query program 200 then analyzes the parameters of the tracked previous versions of query 116 and evaluates the parameters of query 116 for a specified order (e.g., ascending order, descending order, alphabetical, sequential, etc.), thus indicating a recognizable pattern. In one embodiment, anticipatory query program 200 determines a recognizable pattern based on a predefined number of similar versions of query 116 occurring that are in a specified order. In another embodiment, anticipatory query program 200 determines a recognizable pattern based on a number of similar versions of query 116 defined by the user through user interface 112, which occur in a specified order.

For example, anticipatory query program 200 identifies nine previous versions of query 116 in the cache that include identical text and input literals of "SELECT customer name, customer address, customer phone, product date FROM business order WHERE product date=." but the product date parameter changes (e.g., parameter starts with March 1 and ends with March 9). Anticipatory query program 200 tracks the nine previous versions of query 116 and determines the minimum number of matches are met and/or exceeded (e.g., predefined minimum number of matches is set to five, and nine previous matching versions were identified); and therefore, determines enough data is present to derive a potential pattern. The parameter for the product date increases in an ordered sequence of March 1, March 2, March 3 . . . March 9; therefore, anticipatory query program 200 identifies the increasing ordered sequence as a pattern.

If anticipatory query program 200 determines query 116 includes a recognizable pattern (decision 210, yes branch), then anticipatory query program 200 determines whether database indices 126 includes the pattern (decision 212). If anticipatory query program 200 determines query 116 does not include a recognizable pattern (decision 210, no branch), then anticipatory query program 200 receives query 116 (step 202).

In decision 212, anticipatory query program 200 determines whether database indices 126 includes the pattern. Anticipatory query program 200 maintains an input parameter window that starts with the most recent query 116 performed and stores adjacent index keys corresponding to the pattern of the input parameters from the analysis of the previous versions of query 116. In one embodiment, anticipatory query program 200 determines the size of the pattern window (e.g., number of adjacent index keys to retrieve) based on a predefined number (e.g., set value, percentage, etc.). In another embodiment, anticipatory query program 200 determines the pattern window based on a value set by the user through user interface 112 (e.g., set to check the next five entries within database indices 126). Anticipatory query program 200 then searches within the input parameter window for the parameter associated with query 116. Anticipatory query program 200 registers a pattern hit and when a match through a comparison is found between the parameter associated with query 116 and the input parameter window. Anticipatory query program 200 registers a pattern miss when a match is not found through a comparison between the parameter associated with query 116 and the input parameter window.

For example, the parameter from the last instance of query 116 is March 10. The adjacent index key values defined in database indices 126 are March 10, March 11, March 12, March 13, and March 14. The next instance of query 116 includes a parameter for March 13. Anticipatory query program 200 searches within the stored input parameter window and locates March 13. Anticipatory query program 200 identifies a pattern hit (e.g., match is found), and anticipatory query program 200 increases the overall number of executions (e.g., total number of comparisons performed including pattern hits and pattern misses) and the total number of pattern hits by one, and the number of pattern misses remains the same (e.g., total number of executions is 1, pattern hits is 1, and pattern misses is 0). Anticipatory query program 200 then adjusts the input parameter window to start at March 13 (e.g., most recent parameter from query 116) and ends at March 17. The next query 116 includes a parameter for March 20. Anticipatory query program 200 again searches within the stored input parameter window but does not locate March 20. Anticipatory query program 200 identifies a pattern miss (e.g., match is not found) and increases the overall number of executions and the number of pattern misses by one and the total number of pattern hits remains the same (e.g., total number of executions is 2, pattern hits is 1, and pattern misses is 1).

Anticipatory query program 200 may be capable of determining database indices 126 includes a pattern once anticipatory query program 200 performs a set number of total executions. Anticipatory query program 200 calculates a ratio relative to the set number of total executions. In one embodiment, anticipatory query program 200 then determines database indices 126 includes a pattern when the ratio of pattern hits to total number of executions meets or exceeds a predetermined value. In another embodiment, anticipatory query program 200 then determines database indices 126 includes a pattern based on a user defined successful pattern hit to total number of execution ratio. For example, when the pattern hit to total number of executions is eighty percent or higher, anticipatory query program 200 determines that a pattern resides within database indices 126. In another embodiment, anticipatory query program 200 determines database indices 126 does not include a pattern when the ratio of pattern misses to total number of executions exceeds a predetermined value. In some other embodiment, anticipatory query program 200 determines database indices 126 does not include a pattern when the number of pattern misses exceeds the number of pattern hits (e.g., predefined value, percentage, user set value, etc.). In yet some other embodiment, anticipatory query program 200 determines database indices 126 does not include a pattern due to an insufficient number of executions.

If anticipatory query program 200 determines database indices 126 includes the pattern (decision 212, yes branch), then anticipatory query program 200 predicts and performs future queries (step 214). If anticipatory query program 200 determines database indices 126 do not include the pattern (decision 212, no branch), then anticipatory query program 200 receives query 116 (step 202).

In step 214, anticipatory query program 200 predicts and performs future predicted versions of query 116. Anticipatory query program 200 predicts the next query 116 that would occur by incorporating the pattern into query 116 (e.g., updates the parameter within query 116 to be the next predicted future parameter value). For example, the product date is found to include a pattern that increases by one calendar day with each subsequent query 116 request. Anticipatory query program 200 therefore applies the pattern and predicts the next query would be where product date=March 11. Anticipatory query program 200 then performs predicted query 116 without receiving query 116 from the user through user interface 112. Anticipatory query program 200 is capable of performing multiple pattern based on predicted versions of query 116. In one embodiment, anticipatory query program 200 performs a set number of predicted versions of query 116 (e.g., predefined, user defined, etc.). In some other embodiment, anticipatory query program 200 performs predicted versions of query 116 based on the number of computing devices, memory, and input/output devices available for processing.

In step 216, anticipatory query program 200 stores the results of the future predicted versions of query 116 in memory for future use. Anticipatory query program 200 then returns and waits to receive a query from a user through user interface 112 (i.e., completes the initial instance of query 116 and is ready to receive another query). Anticipatory query program 200 continues to operate until a user ends the session by closing database client program 114, which also closes anticipatory query program 200.

In step 218, anticipatory query program 200 displays the results of query 116. In one embodiment, anticipatory query program 200 displays the results of query 116 at the completion of processing of query 116. In another embodiment, anticipatory query program 200 displays the results of query 116 after anticipatory query program 200 retrieves pre-query results 124 from memory.

Figure 3:
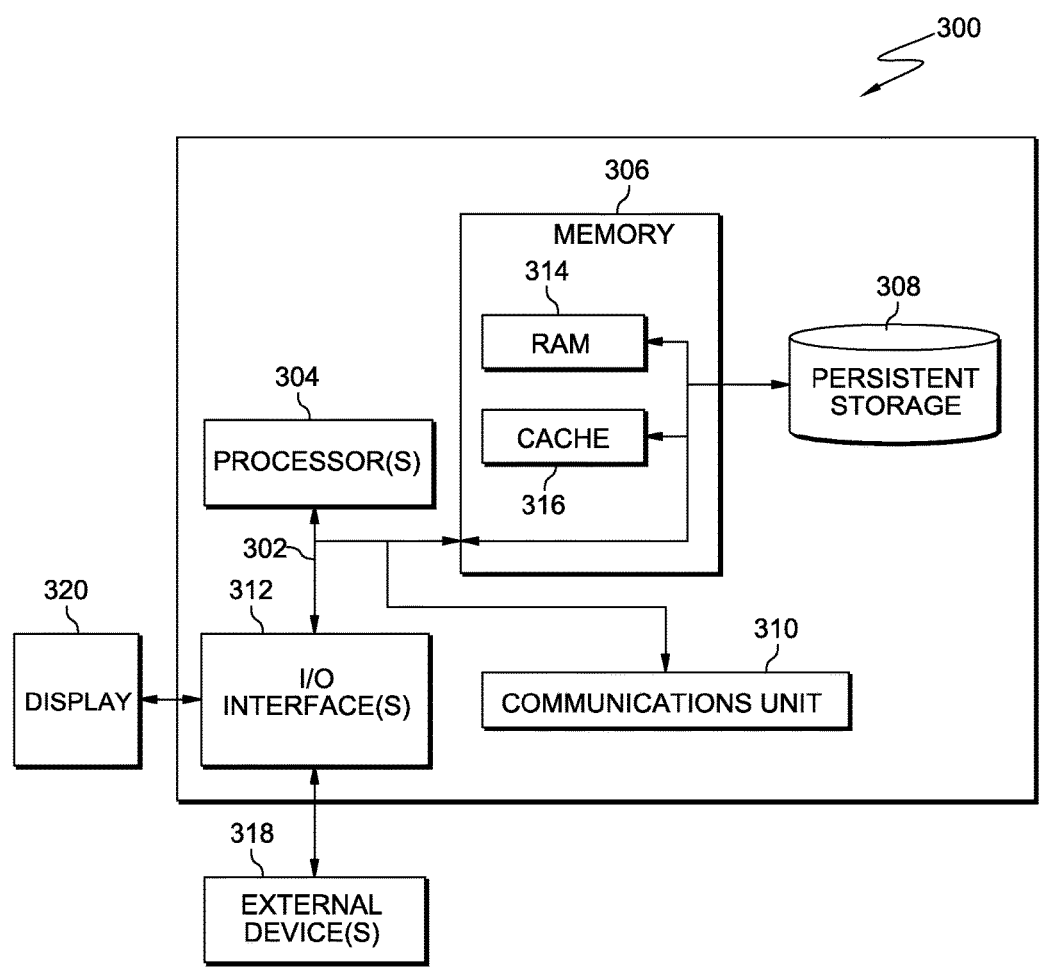
FIG. 3 is a block diagram of components of the server computer executing the anticipatory query program, in accordance with an embodiment of the present invention.

FIG. 3 depicts a block diagram of components of server computer 300, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

User interface 112, database client program 114, query 116, storage 122, pre-query results 124, database indices 126, and anticipatory query program 200 are stored in persistent storage 308 for execution and/or access by one or more of the respective computer processor(s) 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of enterprise grid and client devices. In these examples, communications unit 310 includes one or more network interface cards. Communications unit 310 may provide communications through the use of either or both physical and wireless communications links. User interface 112, database client program 114, query 116, storage 122, pre-query results 124, database indices 126, and anticipatory query program 200 may be downloaded to persistent storage 308 through communications unit 310.

I/O interface(s) 312 allows for input and output of data with other devices that may be connected to server computer 300. For example, I/O interface(s) 312 may provide a connection to external device(s) 318, such as a keyboard, a keypad, a touch screen, and/or some other suitable input device. External device(s) 318 can also include portable computer readable storage media such as, for example, thumb drives, portable optical or magnetic disks, and memory cards. Software and data used to practice embodiments of the present invention, e.g., user interface 112, database client program 114, query 116, storage 122, pre-query results 124, database indices 126, and anticipatory query program 200 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for query processing, the computer program product comprising:
   one or more computer readable storage media and program instructions stored on the one or more computer readable storage media, the program instructions comprising:
   program instructions to receive a query;
   program instructions to determine the received query does not correspond to a previously executed query;
   program instructions to parse the received query to identify input literals that include one or more of: data values, tables, fields, records, and a parameter included in the received query;
   program instructions to determine whether a pattern is associated with the input literals included in the received query;
   responsive to determining a pattern is associated with the input literals included in the received query, program instructions to identify one or more indices that include the pattern;
   program instructions to retrieve one or more adjacent index keys from the identified one or more indices corresponding to the pattern;
   program instructions to determine one or more pattern hits within the retrieved one or more adjacent index keys, wherein the one or more pattern hits are matches between the parameter of the received query and the retrieved one or more adjacent index keys;
   program instructions to store a total number of executions of comparisons of the parameter of the received query to the retrieved one or more adjacent index keys and a total number of the one or more pattern hits;
   program instructions to calculate a ratio of the total number of the one or more pattern hits to the total number of executions;
   program instructions to determine whether the one or more indices include the pattern based on the calculated ratio at least meeting a predetermined value;
   responsive to determining the one or more indices include the pattern based on the calculated ratio at least meeting a predetermined value, program instructions to determine a future parameter based on the pattern associated with the input literals, wherein the future parameter is a subsequent instance of a parameter of the received query that corresponds to the pattern; and program instructions to automatically create a future query by incorporating the determined future parameter into the received query.

2. The computer program product of claim 1, wherein determining whether the pattern is associated with the input literals further comprises program instructions, stored on the one or more computer readable storage media, to:

determine one or more previously executed queries from memory;

determine one or more similar queries from the one or more previously executed queries, wherein the one or more similar queries comprise instances of the one or more previously executed queries that include input literal that match corresponding input literals of the received query except for the parameter; and determine that parameters associated with respective instances of the one or more similar queries includes a recognizable order.

3. The computer program product of claim 1, further comprising program instructions, stored on the one or more computer readable storage media, to:

automatically perform the automatically created future query; and store results of the automatically performed future query.

4. The computer program product of claim 1, further comprising program instructions, stored on the one or more computer readable storage media, to:

receive an another query;

determine the received another query correspond to the automatically performed future query;

retrieve the stored results of the automatically performed future query corresponding to the received another query; and display the retrieved stored results of the automatically performed future query.

5. The computer program product of claim 1, wherein determining the received query does not correspond to a previously executed query further comprises program instructions, stored on the one or more computer readable storage media, to:

perform the received query; and display results of the performed query.

6. A computer system for query processing, the computer system comprising:

one or more computer processors, one or more computer readable storage media, and program instructions stored on the computer readable storage media for execution by at least one of the one or more processors, the program instructions comprising:

program instructions to receive a query;

program instructions to determine the received query does not correspond to a previously executed query;

program instructions to parse the received query to identify input literals that include one or more of: data values, tables, fields, records, and a parameter included in the received query;

program instructions to determine whether a pattern is associated with the input literals included in the received query;

responsive to determining a pattern is associated with the input literals included in the received query, program instructions to identify one or more indices that include the pattern;

program instructions to retrieve one or more adjacent index keys from the identified one or more indices corresponding to the pattern;

program instructions to determine one or more pattern hits within the retrieved one or more adjacent index keys, wherein the one or more pattern hits are matches between the parameter of the received query and the retrieved one or more adjacent index keys;

program instructions to store a total number of executions of comparisons of the parameter of the received query to the retrieved one or more adjacent index keys and a total number of the one or more pattern hits;

program instructions to calculate a ratio of the total number of the one or more pattern hits to the total number of executions;

program instructions to determine whether the one or more indices include the pattern based on the calculated ratio at least meeting a predetermined value;

responsive to determining the one or more indices include the pattern based on the calculated ratio at least meeting a predetermined value, program instructions to determine a future parameter based on the pattern associated with the input literals, wherein the future parameter is a subsequent instance of a parameter of the received query that corresponds to the pattern; and program instructions to automatically create a future query by incorporating the determined future parameter into the received query.

7. The computer system of claim 6, wherein determining whether the pattern is associated with the input literals further comprises program instructions, stored on the one or more computer readable storage media, to:

determine one or more previously executed queries from memory;

determine one or more similar queries from the one or more previously executed queries, wherein the one or more similar queries comprise instances of the one or more previously executed queries that include input literal that match corresponding input literals of the received query except for the parameter; and determine that parameters associated with respective instances of the one or more similar queries includes a recognizable order.

8. The computer system of claim 6, further comprising program instructions, stored on the one or more computer readable storage media, to:

automatically perform the automatically created future query; and store results of the automatically performed future query.

9. The computer system of claim 6, further comprising program instructions, stored on the one or more computer readable storage media, to:

receive an another query;

determine the received another query correspond to the automatically performed future query;

retrieve the stored results of the automatically performed future query corresponding to the received another query; and display the retrieved stored results of the automatically performed future query.

* * * * *